(12) United States Patent
Usui

(10) Patent No.: US 8,984,947 B2
(45) Date of Patent: Mar. 24, 2015

(54) METHOD OF REPRODUCING ABNORMAL SOUND AND JIG

(75) Inventor: Akihiro Usui, Shinagawa-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 13/637,759

(22) PCT Filed: Jan. 25, 2011

(86) PCT No.: PCT/JP2011/051258
§ 371 (c)(1),
(2), (4) Date: Sep. 27, 2012

(87) PCT Pub. No.: WO2011/122082
PCT Pub. Date: Oct. 6, 2011

(65) Prior Publication Data
US 2013/0025356 A1    Jan. 31, 2013

(30) Foreign Application Priority Data

Mar. 30, 2010  (JP) .................................. 2010-078060

(51) Int. Cl.
*G01M 17/00* (2006.01)
*G01H 17/00* (2006.01)

(52) U.S. Cl.
CPC .................................. *G01H 17/00* (2013.01)
USPC ......................................... 73/669; 73/118.02

(58) Field of Classification Search
USPC .............. 73/114.77, 116.01, 116.02, 117.01, 73/118.01, 118.02, 669
See application file for complete search history.

(56) References Cited

U.S. PATENT DOCUMENTS

| | | | |
|---|---|---|---|
| 3,903,738 A * | 9/1975 | Malchow | 73/862.29 |
| 5,792,948 A * | 8/1998 | Aoki et al. | 73/115.01 |
| 6,098,950 A * | 8/2000 | Zupan et al. | 248/674 |
| 7,353,697 B2 * | 4/2008 | Akkerman et al. | 73/117.03 |
| 7,445,201 B2 * | 11/2008 | Endo | 267/141 |
| 7,694,771 B2 * | 4/2010 | Boughton et al. | 180/232 |
| 8,042,793 B2 * | 10/2011 | Igami | 267/292 |
| 2002/0091471 A1 | 7/2002 | Suzuki | |
| 2002/0183122 A1 | 12/2002 | Sone et al. | |

(Continued)

FOREIGN PATENT DOCUMENTS

| | | |
|---|---|---|
| CN | 101464222 A | 6/2009 |
| CN | 201392239 Y | 1/2010 |

(Continued)

OTHER PUBLICATIONS

International Search Report and Written Opinion dated Apr. 5, 2011 corresponding to International Patent Application No. PCT/JP2011/051258.

(Continued)

*Primary Examiner* — Eric S McCall
(74) *Attorney, Agent, or Firm* — Squire Patton Boggs (US) LLP

(57) ABSTRACT

A method of reproducing abnormal noise comprises: a step of starting an engine while buffer suppressing members for suppressing the buffer function of an engine mount are mounted on the engine mount which buffer-mounts on a vehicle body an engine for driving a vehicle and a shift lever for driving is maintained in a neutral position; and a step of opening and closing the accelerator of the engine while the shift lever for driving is maintained in a neutral position. In the method of reproducing abnormal noise, jigs are used.

10 Claims, 15 Drawing Sheets

(56) References Cited

U.S. PATENT DOCUMENTS

| | | | |
|---|---|---|---|
| 2005/0223786 A1* | 10/2005 | Akkerman et al. | 73/117.3 |
| 2006/0043656 A1* | 3/2006 | Shimizu | 267/140.11 |
| 2006/0108725 A1* | 5/2006 | Ogawa et al. | 267/140.13 |
| 2006/0131798 A1* | 6/2006 | Kang | 267/141.1 |
| 2007/0032968 A1 | 2/2007 | Nakamura | |
| 2008/0054538 A1* | 3/2008 | Igami | 267/140.11 |
| 2009/0188739 A1* | 7/2009 | Boughton et al. | 180/232 |
| 2011/0133375 A1* | 6/2011 | Hwang et al. | 267/140.13 |

FOREIGN PATENT DOCUMENTS

| | | |
|---|---|---|
| CN | 100587416 C | 2/2010 |
| JP | 61-105438 A | 5/1986 |
| JP | 02-063923 A | 3/1990 |
| JP | 03-246118 A | 11/1991 |
| JP | 08-061077 A | 3/1996 |
| JP | 10-170389 A | 6/1998 |
| JP | 2002-206991 A | 7/2002 |
| JP | 2003-019909 A | 1/2003 |
| JP | 2005-98984 A | 4/2005 |
| JP | 2006-329879 A | 12/2006 |
| JP | 3885297 B2 | 2/2007 |
| JP | 2009-068960 A | 4/2009 |
| JP | 2009-216510 A | 9/2009 |

OTHER PUBLICATIONS

Chinese Office Action and Search Report application No. 201180016442.X dated Jun. 4, 2014.

* cited by examiner

METHOD OF REPRODUCING ABNORMAL SOUND AND JIG

TECHNICAL FIELD

The present invention relates to a method of reproducing an abnormal noise which was produced in the passenger compartment of a vehicle in association with vibrations of the vehicle body while the vehicle is traveling, and a jig for use in the method.

BACKGROUND ART

While a vehicle is traveling, its passenger compartment can sometimes make abnormal noises which are not supposed to be generated therein. Such abnormal noises include chatter (noise produced when vehicle body components or small parts are vibrated and brought into contact with each other when the engine vibrates) of the instrument panel, for example. When the vehicle manufacturer or car repair shop is asked to repair the vehicle to stop the chatter, the field service person diagnoses the vehicle while actually driving the vehicle in order to confirm how and where the noise is produced. Alternatively, the field service person puts the vehicle on a vibration exciter, forcibly vibrates the vehicle to reproduce the abnormal sound, confirms the position where it is generated, and diagnoses the vehicle (Japanese Patent No. 3885297).

SUMMARY OF INVENTION

It is a highly troublesome task to actually drive the vehicle and reproduce the abnormal noise, and it suffers a limitation in that it requires a driving course. According to the process disclosed in Japanese Patent No. 3885297, it is necessary to provide a vibration exciter which needs a substantial equipment investment, and the cost of the vibration exciter itself and a space and expenses to install the vibration exciter are entailed. The diagnosis of the vehicle using the vibration exciter takes a lot of trouble including moving the vehicle to the vibration exciter, operating the vibration exciter, etc.

The present invention has been made in view of the above problems. It is an object of the present invention to provide a method of reproducing an abnormal noise easily and at a low cost, and a jig for use in such a method.

According to the present invention, there is provided a method of reproducing an abnormal noise produced in the passenger compartment of a vehicle in association with vibrations of a vehicle body thereof while the vehicle is traveling, comprising the steps of starting to operate an engine for propelling the vehicle while a damping limiting member for limiting a damping function of an engine mount is installed on the engine mount which supports the engine on the vehicle body in a damping fashion, and a gearshift lever is kept in a neutral position, and increasing the rotational speed of the engine while the gearshift lever is kept in the neutral position.

According to the present invention, while the damping function of the engine mount is limited and the gearshift lever is kept in the neutral position, the engine is started to operate and the rotational speed thereof is increased. It is thus possible to transmit vibrations of the engine to the vehicle body, without damping them, while the vehicle is at rest. As a consequence, it is possible to reproduce an abnormal noise produced in the passenger compartment in association with the vibrations transmitted to the vehicle body.

Consequently, while the vehicle, which a worker has been asked to repair to stop an abnormal noise, is held at rest in a facility such as a repair pit or the like without being actually run, it is possible for the worker or a judging device to confirm a location where an abnormal noise is produced, e.g., where and how chatter of an instrument panel or the like is produced.

Once the damping limiting member is installed in place, it is possible to confirm the generation of an abnormal noise by adjusting the position of the gearshift lever, starting to operate the engine, and increasing the rotational speed thereof. Therefore, the worker can confirm the generation of an abnormal noise in a relatively simple process.

The damping limiting member may comprise a support member fixed to the engine and the vehicle body at a position where the engine mount supports the engine in the damping fashion. Therefore, part of the vibrations that are transmitted from the engine to the engine mount is transmitted to the vehicle body through the support member in bypassing relation to the engine mount. Therefore, it is easy to reproduce an abnormal sound associated with the vibrations that were generated in the passenger compartment while the vehicle was traveling. The process can easily be performed because it is only necessary to fix the support member depending on the position of the engine mount.

The support member may support the engine selectively in a rigidly fixed mode and a loosely fixed mode for adjusting the magnitude of the vibrations. It is thus possible to change vibrations that are transmitted from the engine to the vehicle body. Accordingly, the range of noise reproducing inspections that can be handled can be increased.

The support member may include a plurality of joint members connected by a threaded fastening mechanism, and the rigidly fixed mode and the loosely fixed mode may be adjusted by the strength of fastening by the threaded fastening mechanism.

The engine mount may be fixed to the engine and the vehicle body by a threaded fastening mechanism, and the support member may be fixed to the engine and the vehicle body by the threaded fastening mechanism which is shared by the engine mount. According to the present invention, the support member can be fastened at a position where the engine mount is fixed to the engine and the vehicle body, by the threaded fastening mechanism that is shared by the engine mount (the support member and the engine mount are fastened together). With the support member and the engine mount being fastened together at the two locations, it is possible to cancel the damping function of the engine mount and transmit vibrations of the engine to the vehicle body, vibrating the vehicle body. It is thus possible with a simple arrangement to reproduce and confirm an abnormal noise that is produced in association with the vibrations of the vehicle body.

According to the present invention, there is also provided a jig for canceling the damping function of an engine mount, comprising a support member fixed to the engine and the vehicle body at a position where the engine mount supports the engine in the damping fashion, wherein the support member comprises a jig comprising a first flange held in abutment against an engine-fixed portion of the engine mount which is fixed to the engine and fixed to the engine by a first threaded fastening mechanism which is shared by the engine-fixed portion, a second flange held in abutment against a vehicle-body-fixed portion of the engine mount which is fixed to the vehicle body and fixed to a member of the vehicle body by a second threaded fastening mechanism which is shared by the vehicle-body-fixed portion, and a rigid body connecting the first flange and the second flange to each other.

According to the present invention, the first flange can be fastened to the engine-fixed portion of the engine mount by the first threaded fastening mechanism, and the second flange can be fastened to the vehicle-body-fixed portion of the engine mount by the second threaded fastening mechanism. With the support member and the engine mount being fastened together at the two locations, it is possible to cancel the damping function of the engine mount and transmit vibrations of the engine to the vehicle body, vibrating the vehicle body. It is thus possible with a simple arrangement to reproduce and confirm an abnormal noise that is produced in association with the vibrations of the vehicle body.

The support member may include two installing rigid links each having a first flange installed on an engine side or vehicle body side of the engine mount and a second flange perpendicular to the first flange, and a plurality of connecting rigid links each having a third flange and a fourth flange which are displaced from each other along longitudinal directions and angularly spaced from each other by 90 degrees about a hypothetical axis along the longitudinal directions, wherein the connecting rigid links may be disposed between the two installing rigid links, and the angles between the connecting rigid links that are connected to each other may be adjusted to place the first flange of one of the two installing rigid links at a position where the engine side of the engine mount is installed and to place the first flange of the other installing rigid link at a position where the vehicle body side of aid engine mount is installed.

With the above arrangement, the angles between the connecting rigid links that are connected to each other are adjusted to place the first flange of one of the two installing rigid links at a position where the engine side of the engine mount is installed and to place the first flange of the other installing rigid link at a position where the vehicle body side of aid engine mount is installed. Therefore, even in a plurality of situations where the engine mount is installed on the engine and the vehicle body at positions that are not in the same plane (e.g., if the engine mount is installed on the engine and the vehicle body at different angles or is disposed at different heightwise positions on the engine and the vehicle body), it is possible with the single jig to cancel the damping function of the engine mount and transmit vibrations of the engine to the vehicle body. As a consequence, it is possible with the single jig to perform an inspection to reproduce an abnormal noise with a plurality of vehicle types.

The jig may further comprise a plurality of length adjusting rigid links each having a fifth flange and a sixth flange which are of a flat shape as a whole, are displaced from each other in the longitudinal directions, and extend parallel to each other, wherein at least two of the fifth flanges and the sixth flanges of the length adjusting rigid links may be connected to the second flanges of the installing rigid links or the third flanges or the fourth flanges of the connecting rigid links, and the connecting rigid links and the length adjusting rigid links may be disposed in a combination between the two installing rigid links.

Since the length adjusting rigid links are of a flat shape as a whole, they can be manufactured more easily than the connecting rigid links that are of a twisted structure. Therefore, the length adjusting rigid links can be manufactured less costly than the connecting rigid links. With the length adjusting rigid links being combined with the connecting rigid links, the jig can be manufactured inexpensively.

Each of the second through sixth flanges may be fixed in position by a bolt through a washer for adjusting the fastening strength of the bolt. By adjusting the fastening strength with the washer, it is possible to adjust the manner in which vibrations are transmitted from the engine to the vehicle body. Accordingly, the range of inspections for reproducing an abnormal noise can be increased.

Alternatively, the support member may include at least five rigid links, each having holes defined in respective opposite ends thereof, interconnected by a threaded fastening mechanism, wherein each of two of the rigid links may comprise a bent rigid link having a first flange having a first hole defined therein and extending in longitudinal directions, and a second flange having a second hole defined therein and extending widthwise directions perpendicular to the first flange, each of at least other two of the rigid links may comprise a twisted rigid link having a third flange having a third hole defined therein and extending in longitudinal directions, and a fourth flange having a fourth hole defined therein and extending in the longitudinal directions, the third hole and the fourth hole being in twisted positional relationship, the bent rigid links may be disposed respectively at opposite ends of the jig, and the second flanges of the bent rigid links and the third flanges of the twisted rigid links may be interconnected at twisted junctions which are disposed in at least one and other ends of the jig.

With the above arrangement, the jig has on its opposite sides twisted junctions where the bent rigid links and the twisted rigid links are connected to each other. In the twisted junctions, two of X, Y, Z axes can be adjusted. In addition, the three axes can also be adjusted if the relative positions of the twisted junctions are adjusted using at least one rigid link interconnecting the twisted junctions, for example. Therefore, even if the first hole of the bent rigid link on the engine and the first hole of the bent rigid link on the vehicle body are in twisted positional relationship, it is possible to connect the engine and the vehicle body to each other to transmit the vibrations from the engine to the vehicle body by adjusting the orientation of the twisted rigid links. As a consequence, it is possible with the single jig to perform an inspection to reproduce an abnormal noise with a plurality of vehicle types.

DESCRIPTION OF EMBODIMENTS

A. First Embodiment

1. Arrangement of Jig 10

(1) Overview

Figure 1:
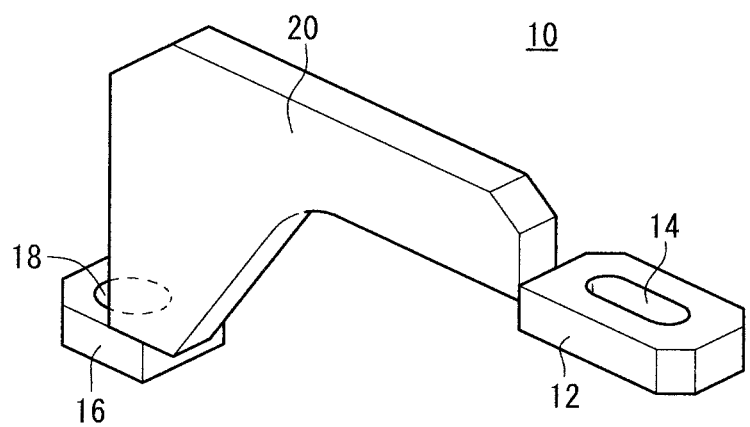
FIG. 1 is a perspective view of a jig according to a first embodiment of the present invention.

FIG. 1 is a perspective view of a jig 10 according to a first embodiment of the present invention. The jig 10 serves to cancel (inhibit) the damping function of an engine mount. It is possible with the jig 10 to confirm the reproduction of an abnormal noise that is produced in the passenger compartment of a vehicle in association with vibrations of the vehicle body while the vehicle is traveling.

As shown in FIG. 1, the jig 10 has a first flange 12 on an end thereof with a first hole 14 defined therein and a second flange 16 on the other end thereof with a second hole 18 defined therein. The jig 10 also has a connector 20 disposed between the first flange 12 and the second flange 16.

(2) Arrangement of Engine and its Periphery

Prior to describing how to use the jig 10, the arrangement of the engine of the vehicle and its periphery will be described first.

Figure 2:
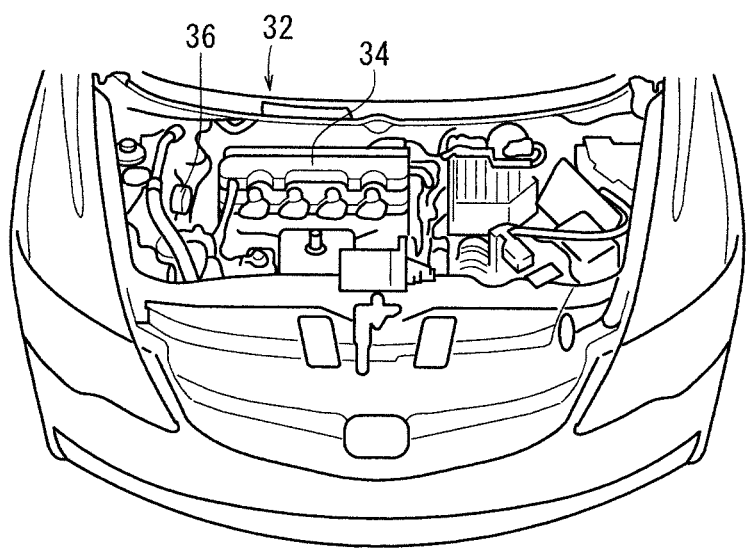
FIG. 2 is a view showing an engine compartment of a vehicle with an engine hood removed.

FIG. 2 is a view showing an engine compartment 32 of a vehicle 30 with an engine hood removed. An engine 34 is disposed substantially centrally in the engine compartment 32. The engine 34 is supported by components of the vehicle body, such as frames, etc., not shown, through a plurality of engine mounts.

In FIG. 2, a side engine mount 36 (hereinafter also referred to as "engine mount 36" or "mount 36") is disposed on the left side of the engine 34 (on the right side as viewed from the driver seat). The engine mount comprises an elastic member of rubber or the like, and has a function to absorb vibrations produced by the engine 34 (damping function). For the structure of the engine mount, reference should be made to Japanese Laid-Open Patent Publication No. 2003-019909, for example.

Figure 3:
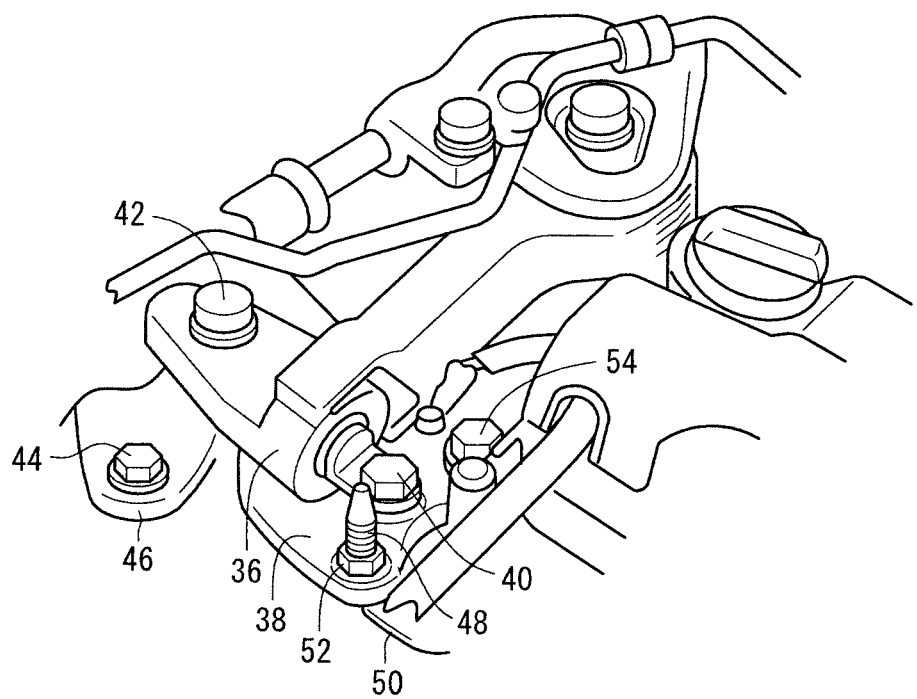
FIG. 3 is a perspective view of a side engine mount and its periphery.

FIG. 3 is a perspective view of the side engine mount 36 and its periphery. The mount 36 is fixed to a bracket 38 of the engine 34 by a bolt 40, and is also fixed to a member 46 of a vehicle body by bolts 42, 44. The bracket 38 has two holes (not shown), one of which receives a screw 48 inserted therein that extends from a member 50 of the engine 34, with a nut 52 threaded over the screw 48. A bolt 54 extends through the other hole and is threaded in a threaded hole defined in the member 50. The bracket 38 is thus fixed to the engine 34.

2. How to Use the Jig 10 (Method of Reproducing an Abnormal Noise)

Figure 4:
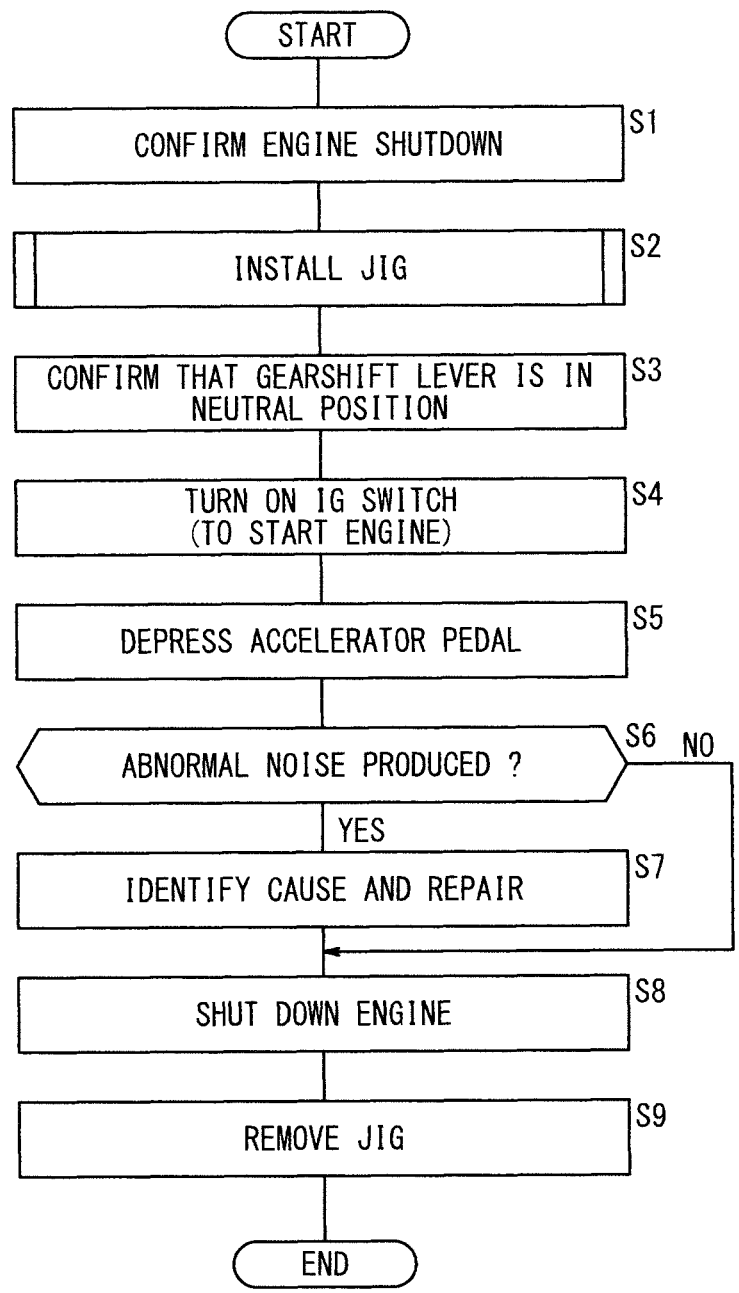
FIG. 4 is a flowchart of a working sequence to be followed by a worker to reproduce an abnormal noise using the jig according to the first embodiment.

FIG. 4 is a flowchart of a working sequence to be followed by a worker to reproduce an abnormal noise using the jig 10.

In step S1, the worker confirms that the engine 34 has shut down. If the engine 34 has not shut down, the worker shuts down the engine 34.

Figure 5:
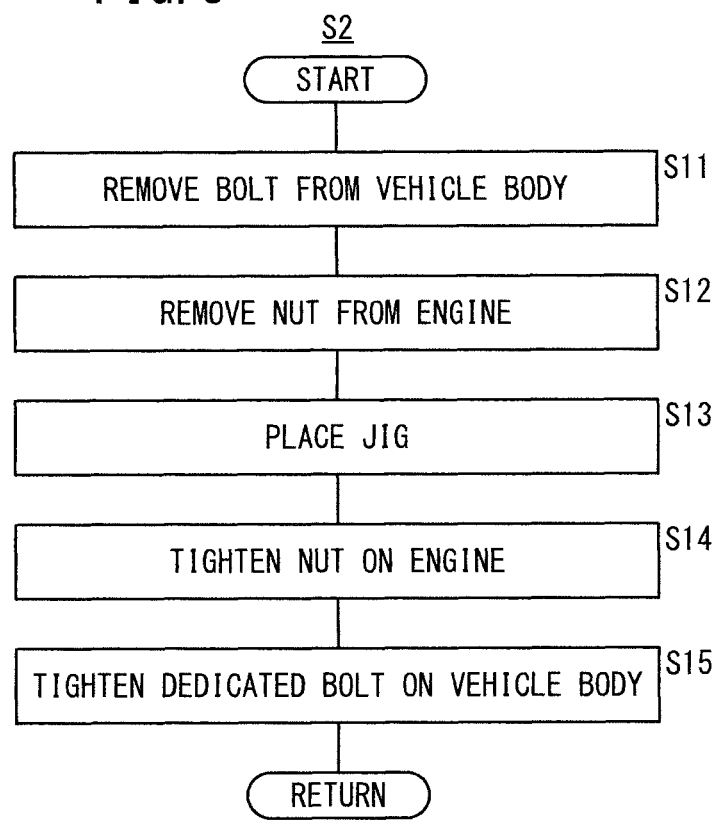
FIG. 5 is a flowchart of a sequence to be followed by the worker to install the jig.

In step S2, the worker installs the jig 10. FIG. 5 is a flowchart of a sequence to be followed by the worker to install the jig 10.

Figure 6:
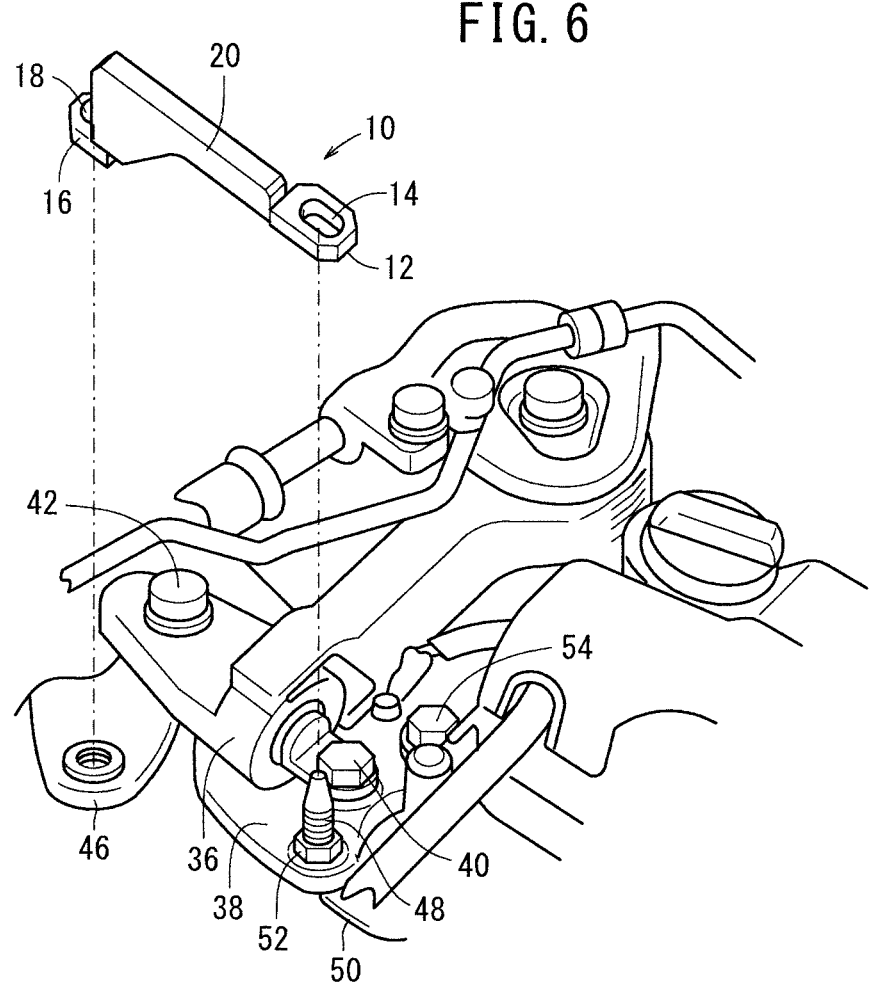
FIG. 6 is a view showing the manner in which the jig according to the first embodiment is to be installed.

In step S11, the worker removes the bolt 44 from the vehicle body. In step S12, the worker removes the nut 52 from the engine 34. In step S13, the worker places the jig 10 so as to extend between the engine 34 and the vehicle body (see FIG. 6).

In step S14, the worker tightens the nut 52 on the engine 34, fastening together the first flange 12 of the jig 10 and the bracket 38 which supports the engine mount 36 (fastening them together).

In step S15, the worker tightens a dedicated bolt 56, instead of the bolt 44 removed from the vehicle body, fastening together the second flange 16 of the jig 10 and the member 46 of the engine mount 36 of the vehicle body (fastening them together). The dedicated bolt 56 is of a sufficient length to fasten the jig 10 and the engine mount to each other (e.g., longer than the bolt 44 by the thickness of the jig 10). If the bolt 44 is of a sufficient length to fasten the jig 10 and the engine mount 36 to each other, then the bolt 44 may be used.

In step S3 in FIG. 4, the worker confirms that the gearshift lever (not shown) of the vehicle 30 is in a neutral position. The neutral position refers to a neutral gear position and a parking position. If the gearshift lever is not in the neutral position, then the worker moves the gearshift lever to the neutral position.

In step S4, the worker turns on an ignition switch (IGSW), not shown, to start operating the engine 34. In step S5, while keeping the gearshift lever in the neutral position, the worker depresses the accelerator pedal to increase the rotational speed of the engine 34. Since the engine 34 and the vehicle body are interconnected by the jig 10, vibrations from the engine 34 are transmitted through the jig 10 to the vehicle body in bypassing relation to the engine mount 36. Therefore, more vibrations are transmitted to the vehicle body. As a result, the vehicle body is violently vibrated though the vehicle 30 is at rest.

In step S6, the worker judges whether an abnormal sound is being produced in the passenger compartment by the vibrations from the engine 34. If an abnormal sound is being produced (S6: YES), then the worker confirms where and how the abnormal sound is produced and repairs the causal location. If an abnormal sound is not being produced (S6: NO) or after step S7, the worker turns off the IGSW to stop operating the engine 34 in step S8. In step S9, the worker removes the jig 10, and the puts the vehicle 30 back into its original state.

3. Advantages of the First Embodiment

According to the first embodiment, as described above, while limiting the damping function of the engine mount 36 with the jig 10 and keeping the gearshift lever in the neutral position, the worker starts operating the engine 34 and operates the accelerator pedal. It is thus possible to transmit vibrations of the engine 34 to the vehicle body, without damping them, while the vehicle 30 is at rest. As a consequence, it is possible to reproduce an abnormal noise produced in the passenger compartment in association with the vibrations transmitted to the vehicle body.

Consequently, while the vehicle 30, which the worker has been asked to repair to stop an abnormal noise, is held at rest in a facility such as a repair pit or the like without being actually run, it is possible for the worker or a judging device to confirm a location where an abnormal noise is produced, e.g., where and how chatter of an instrument panel or the like is produced.

Once the jig 10 is installed in place, it is possible to confirm the generation of an abnormal noise by adjusting the position of the gearshift lever, starting to operate the engine 34, and opening and closing the accelerator. Therefore, the worker can confirm the generation of an abnormal noise in a relatively simple process.

Figure 7:
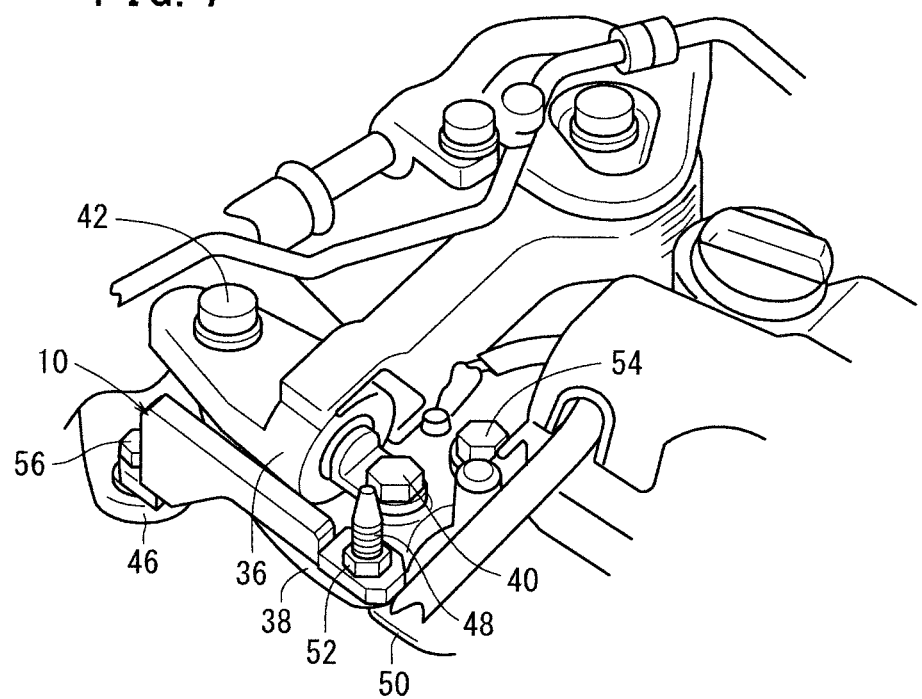
FIG. 7 is a view showing a state in which the jig according to the first embodiment is installed.

According to the first embodiment, the jig 10 is fixed to the engine 34 and the vehicle body at a position where the engine mount 36 supports the engine 34 in a damping fashion (see FIG. 7). Therefore, part of the vibrations that are transmitted from the engine 34 to the engine mount 36 is transmitted to the vehicle body through the jig in bypassing relation to the engine mount 36. Therefore, it is easy to reproduce an abnormal sound associated with the vibrations that were generated in the passenger compartment while the vehicle 30 was traveling. The process can easily be performed because it is only necessary to fix the jig 10 depending on the position of the engine mount 36.

According to the first embodiment, the engine mount 36 is fixed to the engine 34 by the screw 48 and the nut 52 and to the vehicle body by the dedicated bolt 56 (or the bolt 44). The jig 10 is fixed to the engine 34 by the screw 48 and the nut 52 that are shared by the engine mount 36, and to the vehicle body by the dedicated bolt 56 (or the bolt 44) that is shared by the engine mount 36. Therefore, the jig 10 and the engine mount 36 are fastened together at a position where the engine mount 36 is fixed to the engine 34 and the vehicle body. With the jig 10 and the engine mount 36 being fastened together at the two locations, it is possible to cancel the damping function of the engine mount 36 and transmit vibrations of the engine 34 to the vehicle body, vibrating the vehicle body. It is thus possible with a simple arrangement to reproduce and confirm an abnormal noise that is produced in association with the vibrations of the vehicle body.

B. Second Embodiment

1. Arrangement of Jig 100 (Differences with the First Embodiment)

Figure 8:
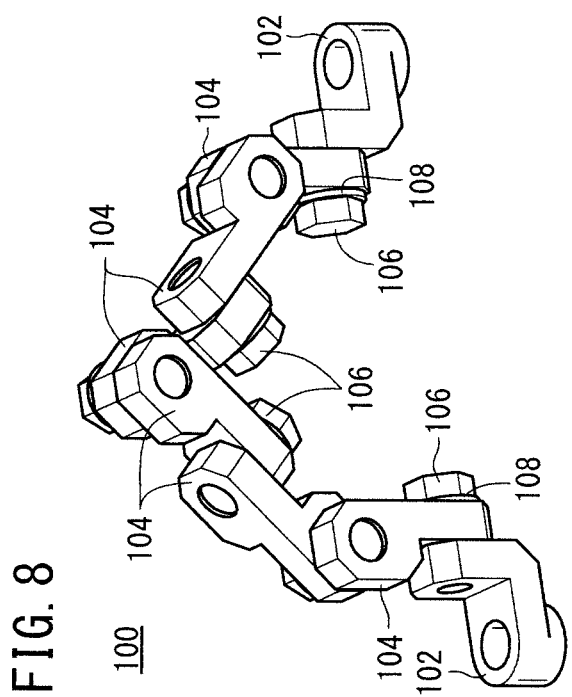
FIG. 8 is a perspective view of a jig according to a second embodiment of the present invention.
Figure 9:
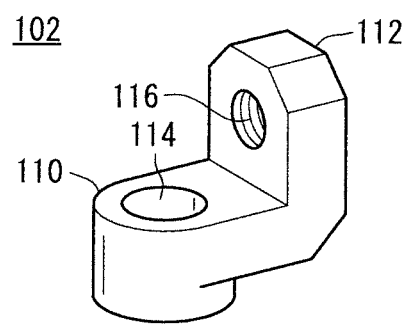
FIG. 9 is a perspective view of a first link of the jig according to the second embodiment.
Figure 10:
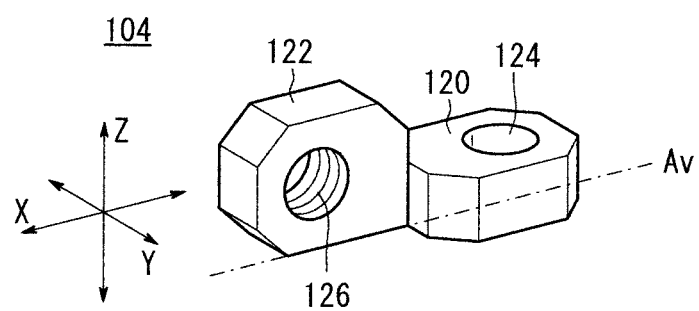
FIG. 10 is a perspective view of a second link of the jig according to the second embodiment.
Figure 11:
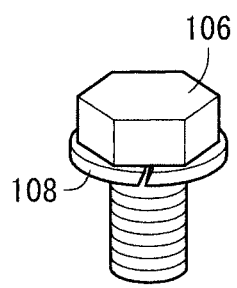
FIG. 11 is a perspective view of a bolt and a washer of the jig according to the second embodiment.

FIG. 8 is a perspective view of a jig 100 according to a second embodiment of the present invention. FIG. 9 is a perspective view of a first link 102 of the jig 100. FIG. 10 is a perspective view of a second link 104 of the jig 100. FIG. 11 is a perspective view of a bolt 106 and a washer 108 of the jig 100. As with the jig 10 according to the first embodiment, the jig 100 serves to cancel (inhibit) the damping function of an engine mount such as the side engine mount 36 or the like. It is possible with the jig 100 to confirm the reproduction of an abnormal noise that is produced in the passenger compartment of the vehicle 30 in association with vibrations of the vehicle body while the vehicle 30 is traveling.

The jig 100 is used in basically the same procedure as the jig 10 according to the first embodiment. However, since the jig 100 can change its configuration unlike the jig 10, it can transmit vibrations from the engine 34 to the vehicle body with a plurality of vehicle types and a plurality of regions. As a result, it is possible with the single jig 100 to perform an inspection to reproduce an abnormal noise with a plurality of vehicle types and a plurality of regions.

As shown in FIGS. 8 through 11, the jig 100 comprises four types of members. Specifically, the jig 100 has first links 102 (installing rigid links, bent rigid links) disposed respectively at opposite ends thereof, a plurality of second links 104 (connecting rigid links, twisted rigid links) interconnecting the first links 102, bolts 106 connecting and securing the first links 102 and the second links 104 or connecting and securing the second links 104, and washers 108 for adjusting the fastening strength of the bolts 106.

Each of the first links 102 is a member corresponding to the first flange 12 or the second flange 16 of the jig 10 according to the first embodiment, and comprises a rigid body having a first flange 110 for being installed on an engine mount (e.g., the side engine mount 36 according to the first embodiment) and a second flange 112 extending perpendicularly to the first flange 110. The first flange 110 has a first hole 114 defined therein for insertion of a bolt (e.g., the dedicated bolt 56 according to the first embodiment) or a screw (e.g., the screw 48 according to the first embodiment) therethrough. The second flange 112 has a second hole 116 defined therein for insertion of the bolt 106 therethrough.

Each of the second links 104 comprises a rigid body having a third flange 120 and a fourth flange 122 which are displaced from each other along the longitudinal directions (the X directions in FIG. 10) and angularly spaced from each other by 90 degrees about a hypothetical axis Av along the longitudinal directions. Stated otherwise, when one of the third flange 120 and the fourth flange 122 is turned through 90 degrees about the hypothetical axis Av, they are held in phase with each other in the X-axis directions. The third flange 120 has an unthreaded third hole 124 defined therein, and the fourth flange 122 has a threaded fourth hole 126 defined therein.

As shown in FIG. 8, in each of the junctions between the first links 102 and the second links 104, the second flange 112 of the first link 102 and the third flange 120 of the second link 104 are connected to each other. In each of the junctions between the second links 104, basically, the third flange 120 of one of the second links 104 and the fourth flange 122 of the other second link 104 are connected to each other, with the fourth flange 122 being positioned at the head of the bolt 106. With the links being thus disposed, it is possible to adjust the angles between one of the second links 104 and the other thereof which are connected to each other.

2. Operation and Advantages of the Jig 100

With the jig 100 according to the second embodiment, the angles between the second links 104 that are connected to each other are adjusted to place the first flange 110 of one of the two first links 102 at the position where the engine mount 36 is installed on the engine 34 (e.g., the position of the screw 48 and the nut 52 in the first embodiment) and to place the first flange 110 of the other first link 102 at the position where the engine mount 36 is installed on the vehicle body (e.g., the position of the bolt 44 according to the first embodiment). Therefore, even in a plurality of situations where the engine mount 36 is installed on the engine 34 and the vehicle body at positions that are not in the same plane (e.g., if the two bolts inserted in the first holes 114 extend at different angles or are disposed at different heightwise positions), it is possible with the single jig 100 to cancel the damping function of the engine mount 36 and transmit vibrations of the engine 34 to the vehicle body. As a consequence, it is possible with the single jig 100 to perform an inspection to reproduce an abnormal noise with a plurality of vehicle types and a plurality of positions.

According to the second embodiment, each of the second flanges 112, the third flanges 120, and the fourth flanges 122 is fastened in position by the bolt 106 through the washer 108 for adjusting the fastening strength. By adjusting the fastening strength with the washer 108, it is possible to adjust the manner in which vibrations are transmitted from the engine 34 to the vehicle body. Accordingly, the range of inspections for reproducing an abnormal noise can be increased.

According to the second embodiment, as shown in FIG. 8, the jig 100 has on its opposite sides twisted junctions where the first links 102 and the second links 104 are connected to each other. In the twisted junctions, two of X, Y, Z axes can be adjusted. In addition, the three axes can also be adjusted if the relative positions of the twisted junctions are adjusted using one or more of the second links 104 interconnecting the twisted junctions. Therefore, even if the first hole 114 of one of the two first links 102 and the first hole 114 of the other first link 102 are in twisted positional relationship, it is possible to connect the engine 34 and the vehicle body to each other to transmit the vibrations from the engine 34 to the vehicle body by adjusting the orientation of the second links 104. As a consequence, it is possible with the single jig 100 to perform an inspection to reproduce an abnormal noise with a plurality of vehicle types or positions.

C. Third Embodiment

1. Arrangement of Jig 150 (Differences with the Second Embodiment)

Figure 12:
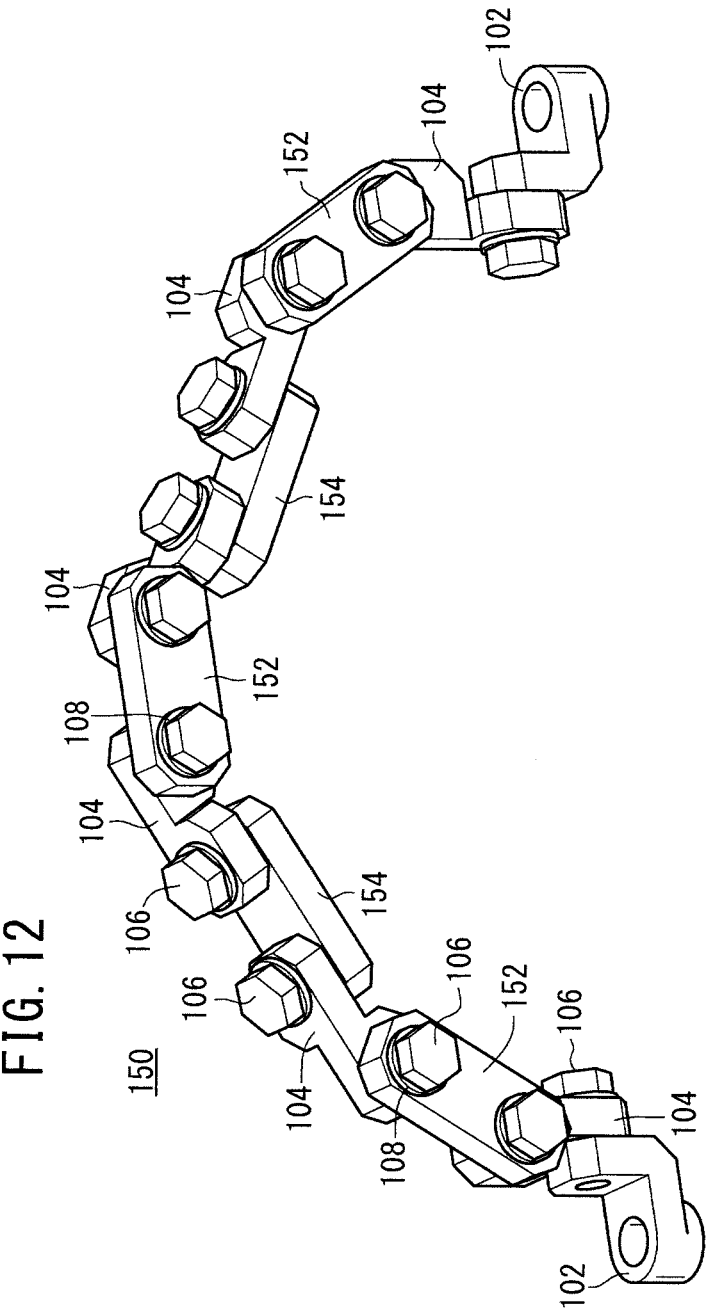
FIG. 12 is a perspective view of a jig according to a third embodiment of the present invention.
Figure 13:
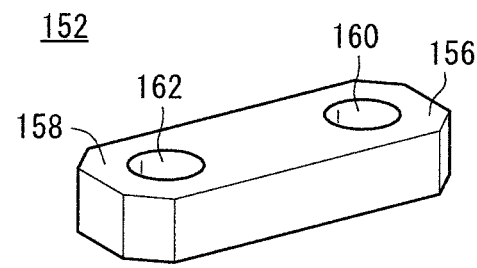
FIG. 13 is a perspective view of a third link of the jig according to the third embodiment.
Figure 14:
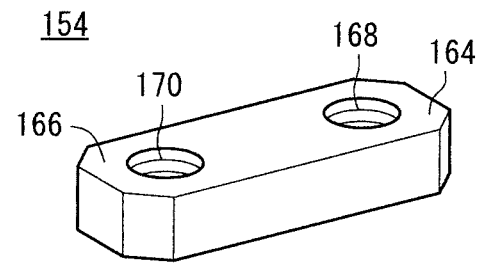
FIG. 14 is a perspective view of a fourth link of the jig according to the third embodiment.

FIG. 12 is a perspective view of a jig 150 according to a third embodiment of the present invention. FIG. 13 is a perspective view of a third link 152 of the jig 150. FIG. 14 is a perspective view of a fourth link 154 of the jig 150. As with the jig 100 according to the second embodiment, the jig 150 serves to cancel (inhibit) the damping function of an engine mount such as the side engine mount 36 or the like. It is possible with the jig 150 to confirm the reproduction of an abnormal noise that is produced in the passenger compartment of the vehicle 30 in association with vibrations of the vehicle body while the vehicle 30 is traveling.

The jig 150 is used in basically the same procedure as the jig 100 according to the second embodiment. However, unlike the jig 100 according to the second embodiment, the jig 150 additionally includes third links 152 and fourth links 154 (length adjusting rigid links).

As shown in FIGS. 12 through 14, the jig 150 comprises six types of members. Specifically, the jig 150 has third links 152 and fourth links 154 in addition to the first links 102, the second links 104, the bolts 106, and the washers 108 as with the second embodiment.

Each of the third links 152 is of a flat shape as a whole, and comprises a rigid body having a fifth flange 156 and a sixth flange 158 which are displaced from each other along the longitudinal directions and extend parallel to each other. The fifth flange 156 and the sixth flange 158 of each of the third links 152 have an unthreaded fifth hole 160 and an unthreaded sixth hole 162 defined respectively therein. Since the third links 152 are axisymmetric, the distinction between fifth flange 156 and the sixth flange 158 and the distinction between the fifth hole 160 and the sixth hole 162 are merely expedient.

Similarly, each of the fourth links 154 is of a flat shape as a whole, and comprises a rigid body having a seventh flange 164 and an eighth flange 166 which are displaced from each other along the longitudinal directions and extend parallel to each other. The seventh flange 164 and the eighth flange 166 of each of the fourth links 154 have a threaded seventh hole 168 and a threaded eighth hole 170 defined respectively therein. Since the fourth links 154 are axisymmetric, the distinction between seventh flange 164 and the eighth flange 166 and the distinction between the seventh hole 168 and the eighth hole 170 are merely expedient.

2. Operation and Advantages of the Jig 150

The jig 150 according to the third embodiment has the same operation and advantages as the jig 100 according to the second embodiment. In addition, the jig 150 according to the third embodiment offers the following advantages: Since the third links 152 and the fourth links 154 are of a flat shape as a whole, they can be manufactured more easily than the second links 104 that are of a twisted structure. Therefore, the third links 152 and the fourth links 154 can be manufactured less costly than the second links 104. With the third links 152 and the fourth links 154 being combined with the second links 104, the jig 150 can be manufactured inexpensively compared with the jig 100.

D. Modification

The present invention is not limited to the above embodiments, but may adopt various arrangements without departing from the scope of the invention. For example, the present invention may adopt the following arrangements:

In the above embodiments, the jigs 10, 100, 150 are applied to the side engine mount 36. However, the jigs 10, 100, 150 may be applied to other engine mounts.

In the above embodiments, the screw 48 and the nut 52 are used as a threaded fastening mechanism on the engine 34, and the bolt 44 is used as a threaded fastening mechanism on the vehicle body. However, the present invention is not limited to such a structure. A bolt and a nut may be used on the engine 34, and a screw and a nut may be used on the vehicle body.

Figure 15:
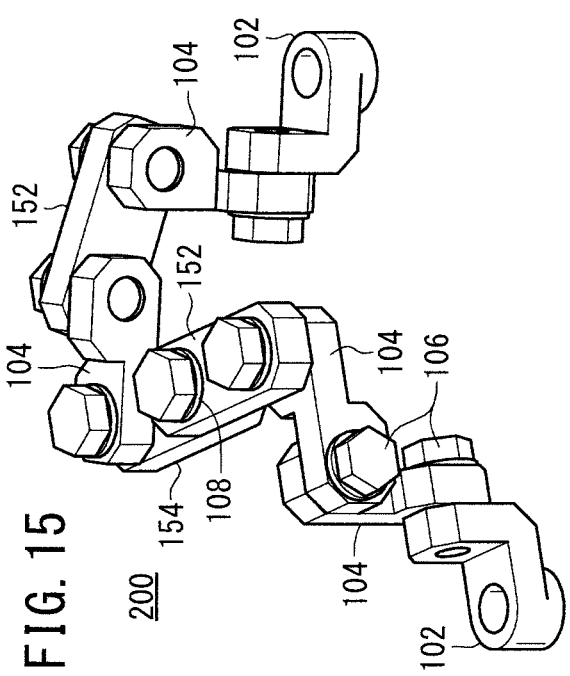
FIG. 15 is a perspective view of a modification of the jig according to the third embodiment.

In the third embodiment, the second links 104, the third links 152, and the fourth links 154 are alternately disposed (104 to 152 to 104 to 154 to 104 to . . . ). However, the present invention is not limited to such a structure. The second links 104, the third links 152, and the fourth links 154 may be arranged in a combination in a jig 200 shown in FIG. 15.

In each of the above embodiments, many steps of the process for reproducing an abnormal noise are performed by the worker. However, the present invention is not limited to such a sequence. Some of the steps of the process may be performed by an apparatus such as a diagnostic apparatus or the like. For example, in each of the above embodiments, the worker judges whether an abnormal noise is produced or not. An abnormal noise may be automatically judged by the process disclosed in Japanese Patent No. 3885297. In such a case, the engine output control (rotational speed control) may be performed by an electronic control unit (ECU) which automatically controls a throttle valve, rather than the worker who operates the accelerator pedal.

The invention claimed is:

1. A method of reproducing an abnormal noise produced in a passenger compartment of a vehicle in association with vibrations of a vehicle body thereof while the vehicle is traveling, said method comprising the steps of:

installing a damping limiting member on an engine mount supporting an engine on the vehicle body in a damping fashion, wherein the damping limiting member is configured to limit a damping function of the engine mount;

starting to operate the engine for propelling the vehicle while the damping limiting member is installed on the engine mount and a gearshift lever is kept in a neutral position;

increasing a rotational speed of the engine while the gearshift lever is kept in the neutral position to reproduce the abnormal noise; and removing the damping limiting member to allow the engine mount to support the engine in the damping fashion.

2. The method according to claim 1, further comprising:
fixing the damping limiting member to the engine and the vehicle body at a position where the engine mount supports the engine in the damping fashion.

3. The method according to claim 2, further comprising:
adjusting a magnitude of the vibrations by selecting a rigidly fixed mode or a loosely fixed mode of the damping limiting member.

4. The method according to claim 3, further comprising:
adjusting a strength of fastening in the rigidly fixed mode and the loosely fixed mode by a threaded fastening mechanism connected to a plurality of joint members of the damping limiting member.

5. The method according to claim 2, further comprising:
fixing the engine mount to the engine and the vehicle body by a threaded fastening mechanism; and
fixing the damping limiting member to the engine and the vehicle body by the threaded fastening mechanism which is shared by the engine mount.

6. A jig configured to cancel a damping function of an engine mount,
wherein the jig is fixed to an engine and a vehicle body at a position where the engine mount supports the engine in a damping fashion,
the jig comprising:
a first flange portion held in abutment against an engine-fixed portion of the engine mount which is fixed to the engine and fixed to the engine by a first threaded fastening mechanism which is shared by the engine-fixed portion;
a second flange portion held in abutment against a vehicle-body-fixed portion of the engine mount which is fixed to the vehicle body and fixed to a member of the vehicle body by a second threaded fastening mechanism which is shared by the vehicle-body-fixed portion; and
a rigid body connecting the first flange portion and the second flange portion to each other.

7. The jig according to claim 6, further comprising:
two installing rigid links each having a first flange installed on an engine side or vehicle body side of the engine mount and a second flange perpendicular to the first flange; and
a plurality of connecting rigid links each having a third flange and a fourth flange which are displaced from each other along longitudinal directions and angularly spaced from each other by 90 degrees about a hypothetical axis along the longitudinal directions;
wherein the connecting rigid links are disposed between the two installing rigid links; and
the angles between the connecting rigid links that are connected to each other are adjusted to place the first flange of one of the two installing rigid links at a position where the engine side of the engine mount is installed and to place the first flange of the other of the two installing rigid links at a position where the vehicle body side of aid engine mount is installed.

8. The jig according to claim 7, further comprising:
a plurality of length adjusting rigid links each having a fifth flange and a sixth flange which are of a flat shape as a whole, are displaced from each other in the longitudinal directions, and extend parallel to each other;
wherein at least two of the fifth flanges and the sixth flanges of the length adjusting rigid links are connected to the second flanges of the installing rigid links or the third flanges or the fourth flanges of the connecting rigid links; and
the connecting rigid links and the length adjusting rigid links are disposed in combination between the two installing rigid links.

9. The jig according to claim 8, wherein each of the second through sixth flanges is fixed in position by a bolt through a washer for adjusting the fastening strength of the bolt.

10. The jig according to claim 6, wherein the jig includes:
at least five rigid links, each having holes defined in respective opposite ends thereof, interconnected by a threaded fastening mechanism;
wherein each of two of the rigid links comprises a bent rigid link having a first flange having a first hole defined therein and extending in longitudinal directions, and a second flange having a second hole defined therein and extending widthwise directions perpendicular to the first flange;
each of at least other two of the rigid links comprises a twisted rigid link having a third flange having a third hole defined therein and extending in longitudinal directions, and a fourth flange having a fourth hole defined therein and extending in the longitudinal directions, the third hole and the fourth hole being in twisted positional relationship;
the bent rigid links are disposed respectively at opposite ends of the jig; and
the second flanges of the bent rigid links and the third flanges of the twisted rigid links are interconnected at twisted junctions which are disposed in at least one and other ends of the jig.

* * * * *